UNITED STATES PATENT OFFICE.

CLIFFORD A. TANEY, OF ST. JOSEPH, MISSOURI.

BLUING AND STARCHING COMPOUND FOR LAUNDRY USE.

SPECIFICATION forming part of Letters Patent No. 577,969, dated March 2, 1897.

Application filed October 26, 1895. Serial No. 567,024. (No specimens.)

*To all whom it may concern:*

Be it known that I, CLIFFORD A. TANEY, a citizen of the United States, residing at St. Joseph, in the county of Buchanan and State of Missouri, have invented certain new and useful Improvements in Bluing and Starching Compounds for Laundry Use; and I do declare the following to be a full, clear, and exact description of the invention, such as will enable others skilled in the art to which it appertains to make and use the same.

This invention relates to a bluing and starching compound for laundry use; and it has for its object to produce a cold starch blued the correct tint and by the use of which garments treated will come out pure and white without spot or streak, the objection heretofore experienced and found necessary by the washerwoman or laundryman of adding blue to the starch being dispensed with and a combination made in such proportions by a skilled blender that the result produced will be the same in every case.

In carrying out the invention I take one hundred parts of powdered starch, preferably corn-starch, twenty-five parts of powdered potato-starch or twenty-five parts of wheat-starch, twelve parts of powdered borax, one-half ounce of Prussian blue, one part of powdered sal-soda, two parts of powdered glue, either fish-glue or potato dextrine, and one ounce of oxalic acid and mix the same together so as to thoroughly commingle all of the ingredients, when the compound is ready for use, and may be put up in boxes or other suitable receptacles in a loose pulverized state, or the compound may be pressed into cakes or blocks and placed on the market in such shapes as the manufacturer may desire.

I have found by experiments that good results may be had by using but one starch in the compound, and I prefer to use the corn-starch when but one starch is employed, but as better results can be had by using both the corn-starch and potato-starch or wheat-starch I generally use both, but do not wish to be understood as limiting myself to the use of both in the composition, nor do I wish to be understood as limiting myself to using the ingredients in the proportions stated.

The starch is of course used as a stiffener, while the blue is to give the desired color. The oxalic acid is used to cause the solubility of the blue in water. The borax is used as a preservative, and also serves as a stiffener and improves the gloss. The sal-soda is used as a softener for the water employed in making the starch, while the glue is to give flexibility and add to the polish or gloss. It is obvious that the sal-soda might be omitted and good results obtained.

Having described my invention, what I claim is—

1. The compound described comprising powdered starch, powdered Prussian blue, and a powdered substance which when combined with a liquid will form a solvent, substantially as specified.

2. The composition of matter described consisting of starch, borax, Prussian blue, sal-soda, glue, and oxalic acid, combined in the manner and proportions specified.

3. The compound described comprising powdered starch, powdered Prussian blue, a powdered substance which when combined with a liquid will form a solvent and powdered borax, substantially as specified.

In testimony whereof I affix my signature in presence of two witnesses.

CLIFFORD A. TANEY.

Witnesses:
THOMAS E. TURPIN,
CHARLES H. RAEDER.